United States Patent
Yamamoto

[11] Patent Number: 5,889,350
[45] Date of Patent: Mar. 30, 1999

[54] VIBRATION TYPE DRIVING APPARATUS

[75] Inventor: Shinji Yamamoto, Kawasaki, Japan

[73] Assignee: Canon Kabushiki Kaisha, Tokyo, Japan

[21] Appl. No.: 775,202

[22] Filed: Dec. 30, 1996

[30] Foreign Application Priority Data

Jan. 8, 1996 [JP] Japan ................................. 8-000912

[51] Int. Cl.$^6$ ................................................. H01L 41/08
[52] U.S. Cl. ......................................... 310/316; 318/116
[58] Field of Search ................................. 310/316, 317, 310/319; 318/116

[56] References Cited

U.S. PATENT DOCUMENTS

| | | | |
|---|---|---|---|
| 5,130,619 | 7/1992 | Izuno | 318/116 |
| 5,376,855 | 12/1994 | Suganuma | 310/316 |
| 5,459,369 | 10/1995 | Mitarai et al. | 310/317 |
| 5,461,273 | 10/1995 | Kawasaki et al. | 310/316 |
| 5,477,099 | 12/1995 | Suganuma | 310/316 |
| 5,479,063 | 12/1995 | Suganuma | 310/316 |
| 5,495,152 | 2/1996 | Fukui | 318/116 |
| 5,500,565 | 3/1996 | Okubo | 310/316 |
| 5,539,268 | 7/1996 | Kataoka | 310/316 |
| 5,612,598 | 3/1997 | Fukui et al. | 318/116 |

FOREIGN PATENT DOCUMENTS

| | | |
|---|---|---|
| 3-239168 | 10/1991 | Japan . |
| 04140077 | 5/1992 | Japan . |
| 4-222476 | 8/1992 | Japan . |
| 6-237584 | 8/1994 | Japan . |

*Primary Examiner*—Mark O. Budd
*Attorney, Agent, or Firm*—Fitzpatrick, Cella, Harper & Scinto

[57] ABSTRACT

A driving control apparatus of a vibration motor controls the speed of the vibration motor by simultaneously changing the frequency and the amplitude of signals applied thereto, and upon the speed control, a contribution to a rate of change of speed by a change in the driving frequency and a contribution to the rate of change of speed by a change in the amplitude are varied based on a difference between a target speed.

14 Claims, 11 Drawing Sheets

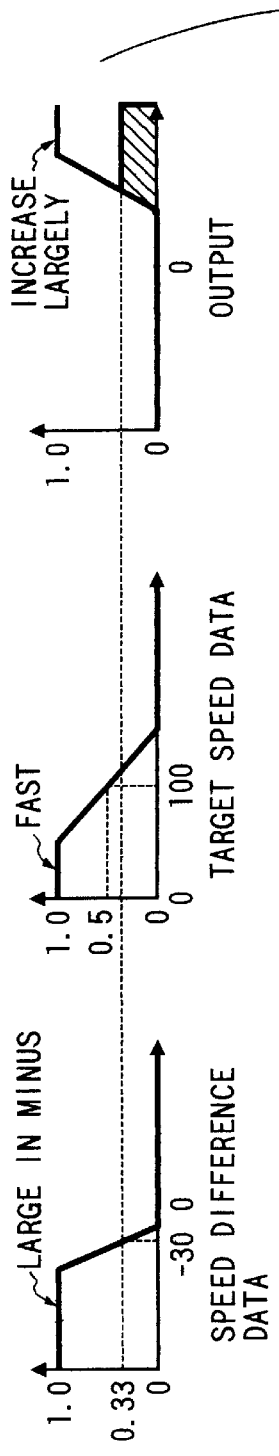
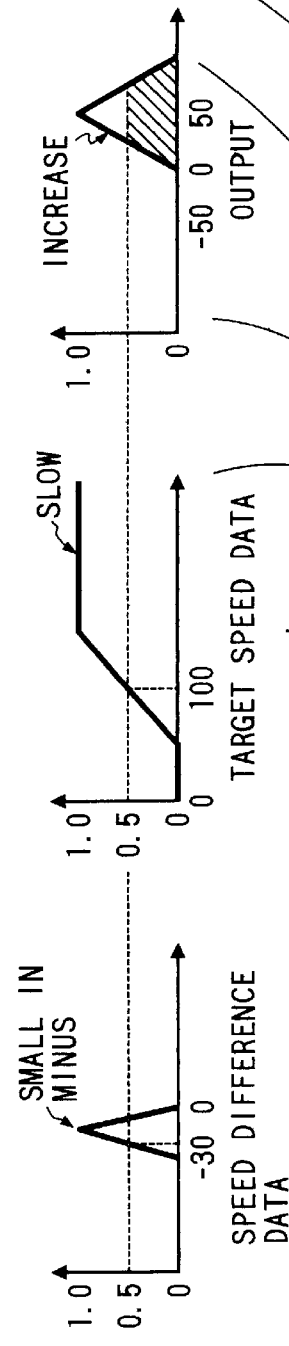
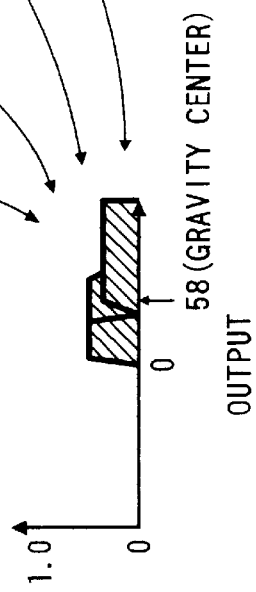
FIG. 11A
FIG. 11B
FIG. 11C

VIBRATION TYPE DRIVING APPARATUS

BACKGROUND OF THE INVENTION

1. Field of the Invention

The present invention relates to a vibration type (vibratory wave) driving apparatus for generating vibration (vibratory wave) in a vibratory body by vibration of piezoelectric element and utilizing the vibration energy to impart driving force to a moving body. More particularly, the invention concerns control of this vibration type driving apparatus.

2. Related Background Art

There are many conventional proposals concerning the control method of such vibration type driving apparatus, and a typical example is a method for controlling operation speed by changing the frequency or the amplitude of a voltage signal (drive signal) applied to the piezoelectric element.

Here, the relationship between the frequency and amplitude of drive signal and the operation (rotation) speed is as shown in FIG. 12. Namely, there are such characteristics that the rotation speed drops gently on the higher frequency side but drops steeply on the lower frequency side with respect to the peak of the resonance frequency of the vibrator. In addition, there are also such characteristics that the rotation speed increases as the amplitude of the drive signal increases.

Incidentally, often used for controlling the speed by change of frequency (hereinafter called frequency speed control) is a VCO (Voltage-Controlled Oscillator) capable of attaining relatively fine frequency resolution against input voltage. However, from the aspect of cost, use of digital circuitry (gate array) is more preferred than use of analog circuitry such as the VCO. In the case of the gate array being used, the frequency of the clock signal determines the frequency of the drive signal and there is a limit for the clock frequency. Therefore, it is not possible to achieve such high frequency resolution as that of VCO. As a result, the speed of the vibration type driving apparatus is controlled only stepwise, which would result in a drawback of easily causing large speed vibrations.

On the other hand, when the speed is controlled by changing the amplitude (hereinafter called amplitude speed control), the control can be performed with less speed vibrations as compared with the frequency speed control with digital circuitry. In order to carry out accurate speed control by the amplitude speed control, it is, however, necessary to keep the drive frequency constantly set at a frequency higher than and close to the resonance frequency. Since the resonance frequency varies with change in the environment including the temperature and change of load, this method has a drawback that accurate speed control is not easy.

Under such circumstances, there are proposals of the following techniques. For example, (1) Japanese Laid-open Patent Applications No. 3-239168 and No. 4-222476 describe such a technique that the vibration frequency of the vibration type driving apparatus is detected and control is made so as to keep the frequency of drive signal always near the resonance frequency and that as for the operation speed, the amplitude of drive signal is changed so as to decrease a difference from a target speed as detecting actual operation speeds. Further, (2) Japanese Laid-open Patent Application No. 6-237584 describes such a technique of control of the operation speed that upon start only the frequency is changed to take the operation speed to near the target speed and thereafter only the amplitude of drive signal is controlled. These techniques as described in the above bulletins enable control with less speed variations by digital circuitry.

However, the above technique of (1) has a problem of cost increase because of a need for means for detecting whether the vibration frequency is kept near the resonance frequency, in addition to means for detecting the operation speed.

Further, the above technique of (2) has problems that the control becomes complex and that the operation of the driving apparatus becomes unstable upon changeover because of a need for changeover between the frequency speed control and the amplitude speed control. Further, the above technique of (2) also has a problem of incapability of reacting against the change of the resonant point of the vibrator as described previously, because the drive frequency is fixed after the real speed becomes close to the target speed.

SUMMARY OF THE INVENTION

One aspect of the application is to provide a control apparatus of the vibration type driving apparatus that can be constructed easily and cheaply, that can reduce speed variations even when digital circuitry is used, and that can prevent unstable operation due to changeover of control.

One aspect of the application is to provide a control apparatus of the vibration type driving apparatus arranged to perform frequency speed control for controlling the operation speed of the vibration type driving apparatus by changing the frequency of the drive signal of the vibration type driving apparatus and amplitude speed control for controlling the operation speed of the vibration type driving apparatus by changing the amplitude of the drive signal, wherein the frequency speed control and amplitude speed control are carried out simultaneously and wherein when the two speed controls are carried out simultaneously, relative weight of the speed controls is changed depending upon a difference between a real speed and a target speed of the vibration type driving apparatus. Specifically, provided is an apparatus wherein if the above speed difference is within a predetermined range, amplitude speed control is mainly carried out to decrease speed variations by fine speed control and wherein if the above speed difference is outside the predetermined range, frequency speed control is mainly carried out to achieve quick approach of the real speed to the target speed by rough speed control.

One aspect of the application is to provide an apparatus wherein upon the above simultaneous execution of the controls, a control amount by frequency speed control is set small if the speed difference is within the predetermined range but is set large if the speed difference is outside the predetermined range and a control amount by amplitude speed control is set large if the speed difference is within the predetermined range but is set small if the speed difference is outside the predetermined range.

Also provided is an apparatus wherein the control amounts by the above frequency speed control and amplitude speed control are determined using a table which stores preset control amounts.

One aspect of the application is to provide an apparatus wherein the above amplitude speed control is replaced by phase difference speed control in which the operation speed of the vibration type driving apparatus is controlled by changing a phase difference between (two) driving signals and wherein the frequency speed control and phase difference speed control are carried out simultaneously.

Other objects of the present invention will become apparent from the description of the embodiments with the accompanying drawings.

BRIEF DESCRIPTION OF THE DRAWINGS

FIGS. 11A, 11B and 11C are drawings to show fuzzy control in the third embodiment.

DESCRIPTION OF THE PREFERRED EMBODIMENTS (First Embodiment)

Figure 1:
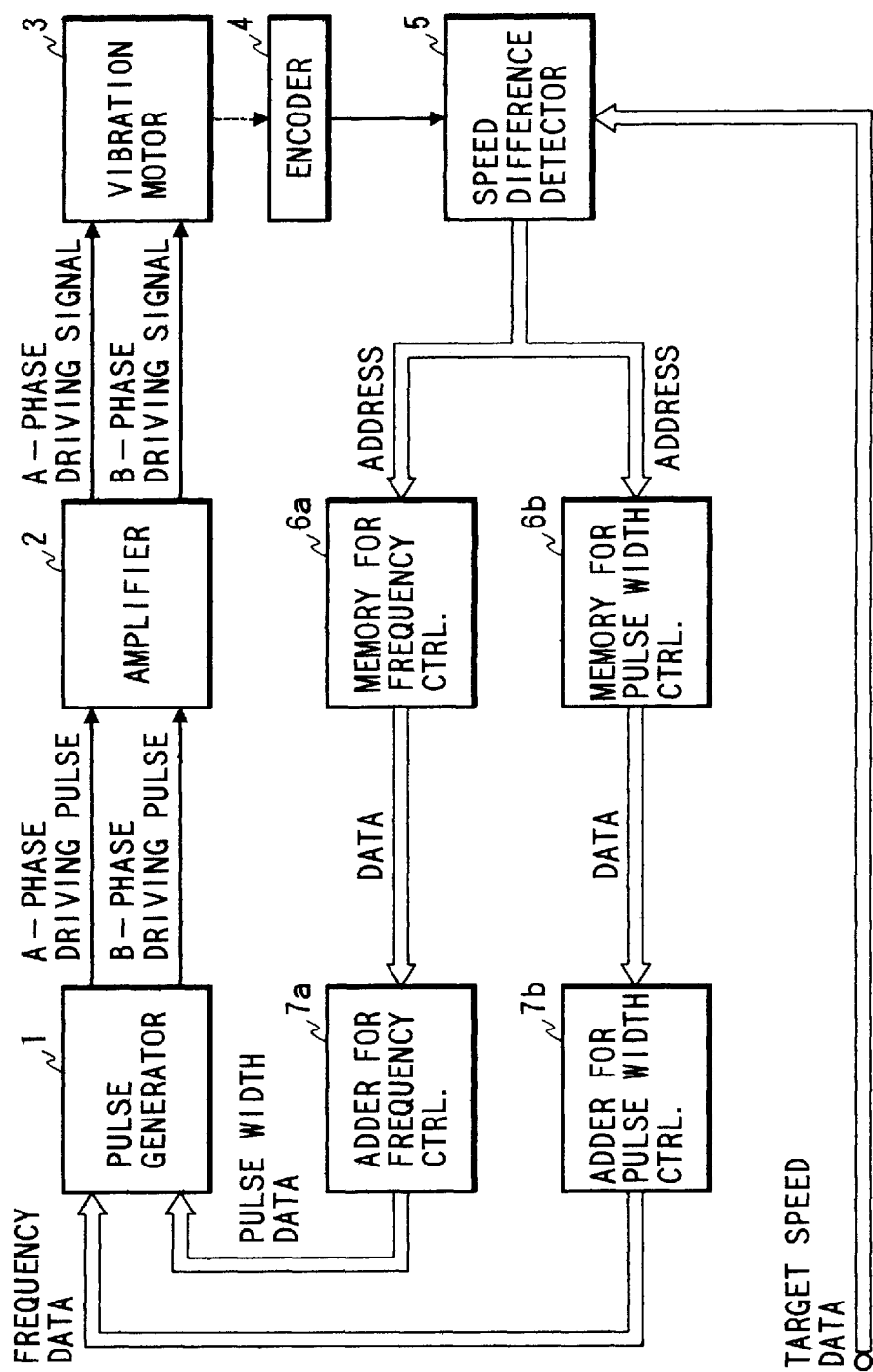
FIG. 1 is a block diagram to show the first embodiment of the present invention.

FIG. 1 is a block diagram to show the structure of the control apparatus of the vibration type motor (vibratory wave driving apparatus) which is the first embodiment of the present invention.

In FIG. 1, reference numeral 1 designates a pulse generator which outputs two-phase pulses according to input frequency data and pulse width data. These two-phase pulses are output with a phase difference of 90°. In order to reduce the cost for circuitry, the pulse generator 1 is composed of digital circuits. Here, the configuration and operation of the pulse generator 1 will be explained referring to FIG. 2.

Figure 2:
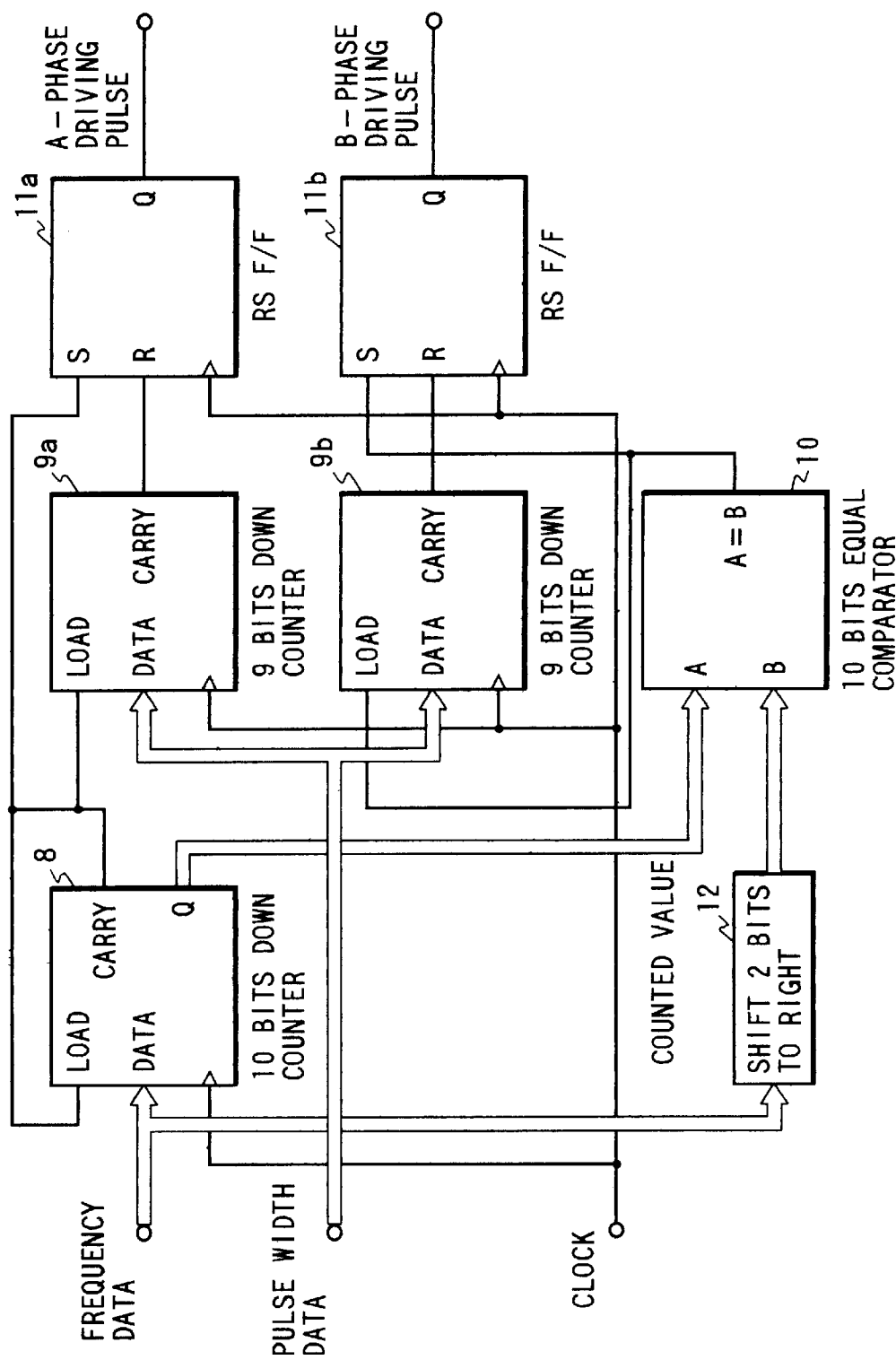
FIG. 2 is a structural drawing of a pulse generator used in the first embodiment.

FIG. 2 is a block diagram to show the internal circuitry of the pulse generator 1. In this figure, numeral 8 denotes a 10-bit counter for determining the period of the drive pulse, which performs only a down count. In this counter 8, the carry output becomes high when the count value turns to 0. Since the carry output is connected to the load input, the counter 8 is a ring counter with the period being the drive frequency data.

Symbols 9a and 9b denote 9-bit counters for determining the pulse width of the drive pulse, which perform only down count. In these counters 9a, 9b, the pulse width data is loaded when the load input becomes high; the carry output becomes high when the count value turns to 0. The counter 9a is for A-phase drive while the counter 9b is for B-phase drive.

Numeral 10 represents a 10-bit equal comparator, the output of which becomes high when the count value of the counter 8 coincides with a value obtained by shifting the frequency data right by two bits, that is, when the counter 8 has counted a quarter of the frequency data.

Symbols 11a and 11b represent RS flip-flops, which are constructed so that rise and fall of drive pulse can be determined by S input and R input, respectively. The RS flip-flop 11a is for A-phase and it starts rising with the carry output of counter 8 and starts falling with the carry output of the counter 9a. Namely, it outputs pulses which have the period of the frequency data and which become high only for a time according to the pulse width data.

The RS flip-flop 11b is for B-phase and it starts rising when the output of the equal comparator 10 becomes high and starts falling with the carry output of the counter 9b. As a result, the RS flip-flop 11b outputs pulses having the same frequency and same pulse width as those in phase A, but having a phase difference in time of 90°. Since in this explanation the frequency data is a command value of drive pulse period, an actual frequency is a value proportional to the reciprocal of the frequency data.

The present embodiment is arranged so that the phase difference between phase A and phase B is always constant and the rotation direction of the vibration motor is only one direction in order to simplify the description. However, if the motor is desired to rotate in the both directions, an unrepresented selector will be used to switch outputs of the RS flip-flops 11a, 11b depending upon the rotation direction.

Figure 3:
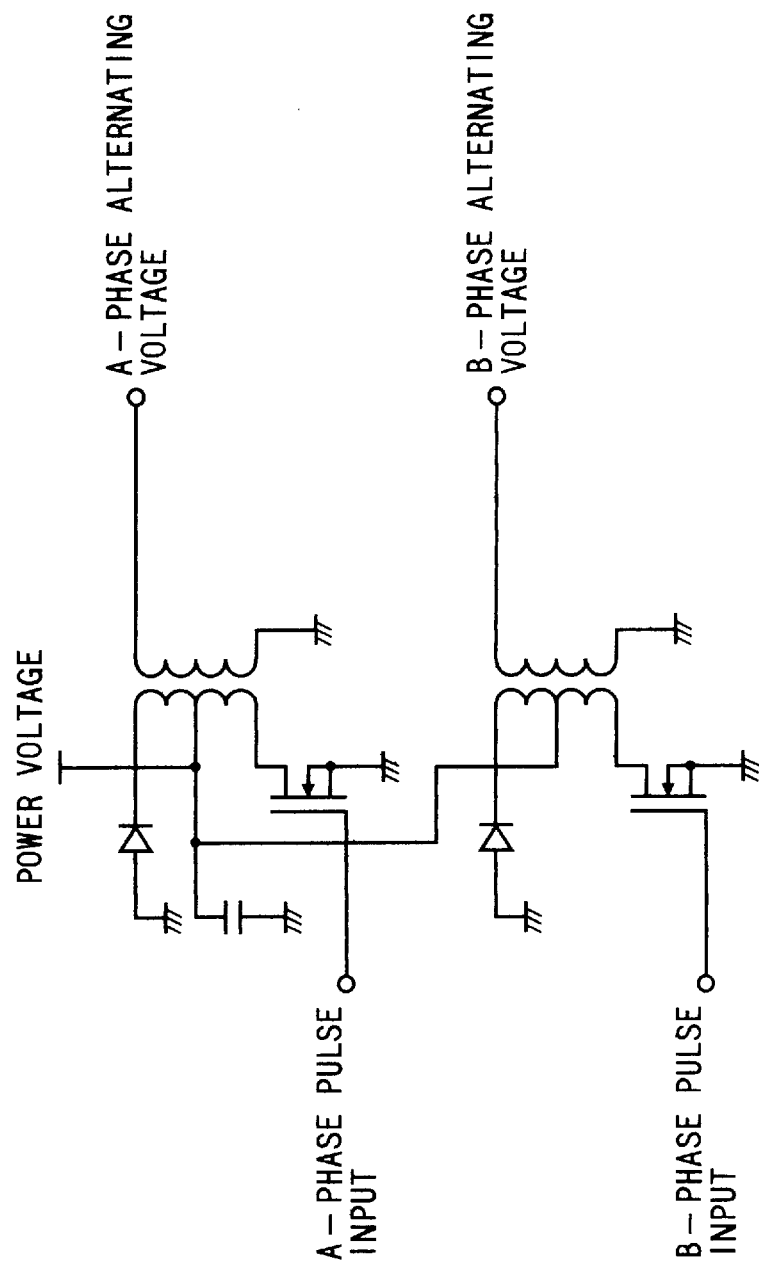
FIG. 3 is a structural drawing of an amplifier in the first embodiment.

Numeral 2 in FIG. 1 is an amplifier, which has the circuit configuration as shown in FIG. 3, for example. The amplifier 2 amplifies the pulses output from the pulse generator 1 up to a voltage according to the frequency of the output pulses and the pulse width thereof.

Numeral 3 in FIG. 1 designates a traveling-wave type vibration motor, in which the two-phase AC voltages amplified by the amplifier 2 are applied to piezoelectric elements (not shown) as electro-mechanical energy conversion elements positioned as shifted by ¼ λ.

Numeral 4 in FIG. 1 denotes an encoder for detecting rotation of the vibration motor, and an output shaft of the vibration motor 3 is attached to a shaft of the encoder 4, so as to detect the above rotation. The encoder 4 outputs pulses according to the rotation of the vibration motor 3. The pulses from the encoder 4 are input into a speed difference detector 5.

The speed difference detector 5 detects a difference between the period of the pulses from the encoder 4 and a target pulse period. Since an output value is detected by pulse period, it is a numerical value proportional to a difference between the reciprocal of drive speed and the reciprocal of target speed.

Figure 4:
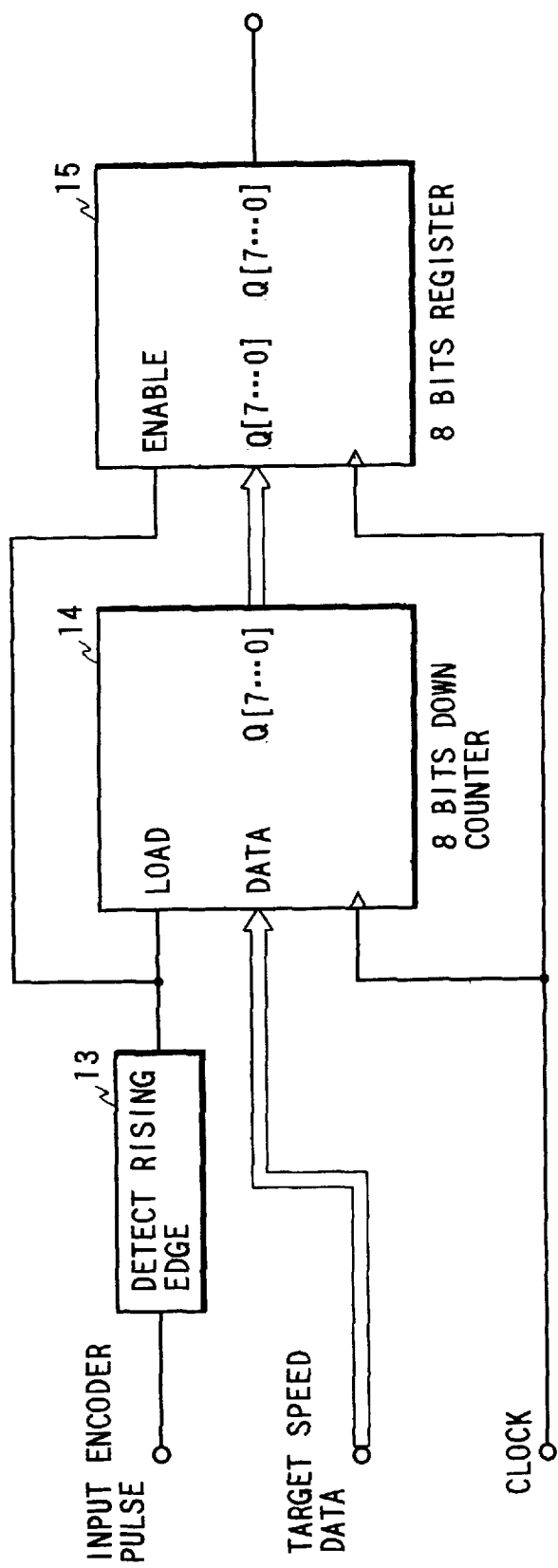
FIG. 4 is a block diagram of a speed detector in the first embodiment.

FIG. 4 is a block diagram to show the circuit configuration of the speed difference detector. In FIG. 4, numeral 13 denotes a block for detecting a rising edge, which outputs a signal becoming high during one period of clock with input of a rising edge of encoder pulse. The rising edge detector 13 is implemented by flip-flop, AND gate, or the like not shown. Numeral 14 is an 8-bit down counter, which is arranged to be loaded with target speed data corresponding to the period of encoder pulse as a target when the load input becomes high, to be counted down one by one with the load data, and to count the time up to a rising edge of the next encoder pulse.

Numeral 15 is a register with enable, which is constructed so that 8-bit input (D[7 . . . 0]) is written in the register when enable input is high and so that a value of the register is held when the enable input is low.

In the configuration of FIG. 4, when the encoder pulse input turns from the low level to the high level, the data of 8-bit down counter 14 is loaded at the same time the value of 8-bit down counter 14 is written in the register 15. Namely, the value obtained by counting the difference between the period of encoder pulse and the target period by clock is always updated in the register 15.

In FIG. 1 symbol 6a is a memory for frequency control and symbol 6b is a memory for pulse width control, to each of which a detection result of the speed difference detector 5 is supplied as an address and each of which outputs data corresponding thereto in accordance with the input information. Preliminarily written in each memory 6a, 6b is information about how to control the frequency (memory 6a) or the pulse width (memory 6b) against the input speed (the pulse period of encoder).

In FIG. 1 symbol 7a designates an adder for frequency control and symbol 7b designates an adder for pulse width control. Each of the adders 7a, 7b holds a preset initial value (holding information) during the "off" period of drive of the vibration motor 3. When drive of the vibration motor 3 becomes "on", the adder 7a is arranged to add input information from the frequency control memory 6a to the holding information at certain constant intervals to hold an addition result.

Outputs from the adders 7a, 7b are supplied as frequency data and as pulse width data to the pulse generator 1. The adders 7a, 7b are constructed in 16-bit configuration. The frequency control adder 7a outputs the upper 10 bits of the addition result to the pulse generator 1 and the pulse width control adder 7b outputs the upper 8 bits of the addition result to the pulse generator 1. This arrangement prevents the frequency and pulse width from changing suddenly.

The speed of vibration motor 3 is controlled by the configuration as described above, but how to perform the control is based on the information written in the memories 6a, 6b. A specific control method will be described in detail.

Figure 5:
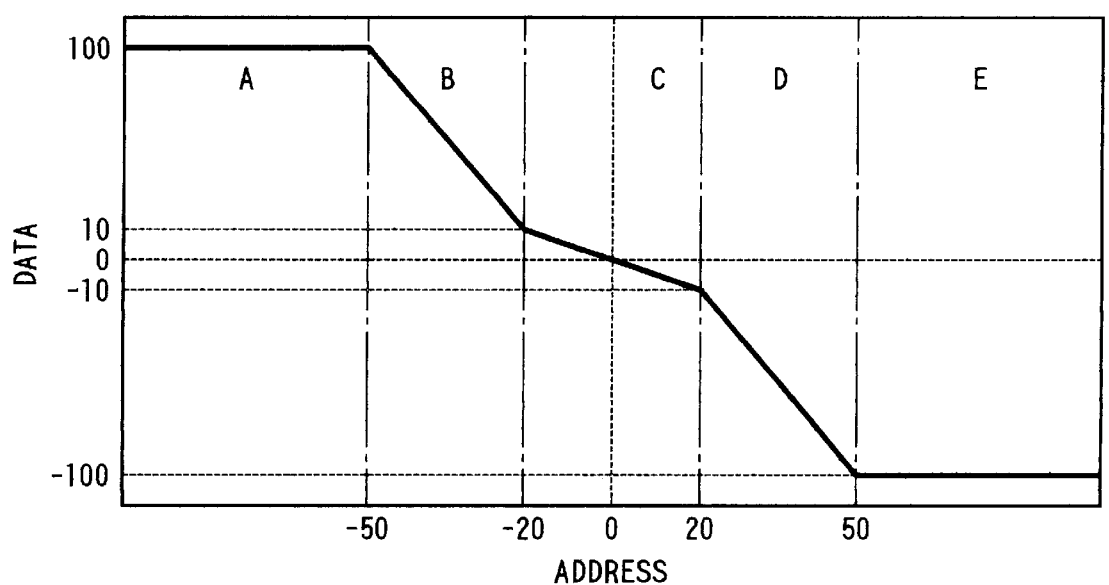
FIG. 5 is a drawing to show information of a frequency control memory in the first embodiment.

FIG. 5 is a chart to show plots of the information written in the frequency control memory 6a. The memory 6a used herein is one with address of 8 bits and data of 8 bits. In FIG. 5 the abscissa represents the address of the memory 6a or the value obtained from the speed difference detector 5, which is indicated with sign. The ordinate represents data stored in the memory 6a, or an addition amount of frequency, which is indicated with sign. For example, supposing control with the target speed of 10 s$^{-1}$ is carried out with the encoder 4 having the pulse number of 3600 per rotation of vibration motor 3 and when the clock of the speed difference detector 5 is 3.6 MHz, the target speed data is the value of 100 obtained by the following equation (1).

$$3.6 \text{ [MHz]}/(10\text{[s}^{-1}\text{]} \times 3600\text{[p/r]}) = 100 \tag{1}$$

Therefore, 100 is input as target speed data to the speed difference detector 5. If the drive speed of the vibration motor 3 is slower than the target, the down count of the speed detector 5 is carried out more than 100, and thus, the memory 6a outputs a value smaller than 0 (or outputs a negative value). On the other hand, if the drive speed is greater than the target speed, the memory 6a outputs a value greater than 0 (or outputs a positive value).

From this, since with a negative value of address the drive speed is smaller than the target speed, the speed is controlled to approach the target speed by decreasing the drive frequency or by setting the data to a positive value. Further, since with a positive value of address the drive speed is greater than the target speed, the speed is controlled to approach the target speed by setting the data to a negative value. In the present embodiment correspondence between frequency and data is made so that the frequency becomes lower with increasing data of the adder 7a.

In FIG. 5 area A is a region where the address is below −50, i.e., where the drive speed detected is smaller than the speed 6.6 s$^{-1}$ obtained by the following equation (2).

$$3.6 \text{ [MHz]}/((100+50) \times 3600\text{[p/r]}) = 6.6\text{[s}^{-1}\text{]} \tag{2}$$

In FIG. 5, constant data of 100 is output in area A. Area B is a region where the address is between −50 and −20, i.e., where, using foregoing Eq. (2), the drive speed detected is between 6.6 s$^{-1}$ and 8.3 s$^{-1}$. In this case, as shown in FIG. 5, data proportional to the difference of the encoder pulse period detected is output. Area C is a region where the drive speed detected is between 8.3 s$^{-1}$ and 12.5 s$^{-1}$.

Also in this case, as in area B, data proportional to the difference of the encoder pulse period detected is output, but a rate of change of data is smaller in this area than in area B. Similarly, a rate of change of data in area D (between 12.5 s$^{-1}$ and 20 s$^{-1}$) is greater than that in area C, and data of constant value of −100 is output in area E (where the drive speed is slower than 20 s$^{-1}$)

As described above, the rate of change of data is changed depending upon the areas, whereby control is effected in such a way that when the speed difference between the target speed and the drive speed detected is outside the certain range (or in the areas of A and E), control is made by as large values of data as possible while the operation of the vibration motor 3 can be prevented from becoming unstable; when the speed difference is within the above range but is relatively large (or when it is in the areas of B and D), the frequencies are changed greatly in accordance with the speed difference; when the speed difference is close to 0 (or when it is in the area of C), the frequencies are changed slightly in accordance with the speed difference.

Figure 6:
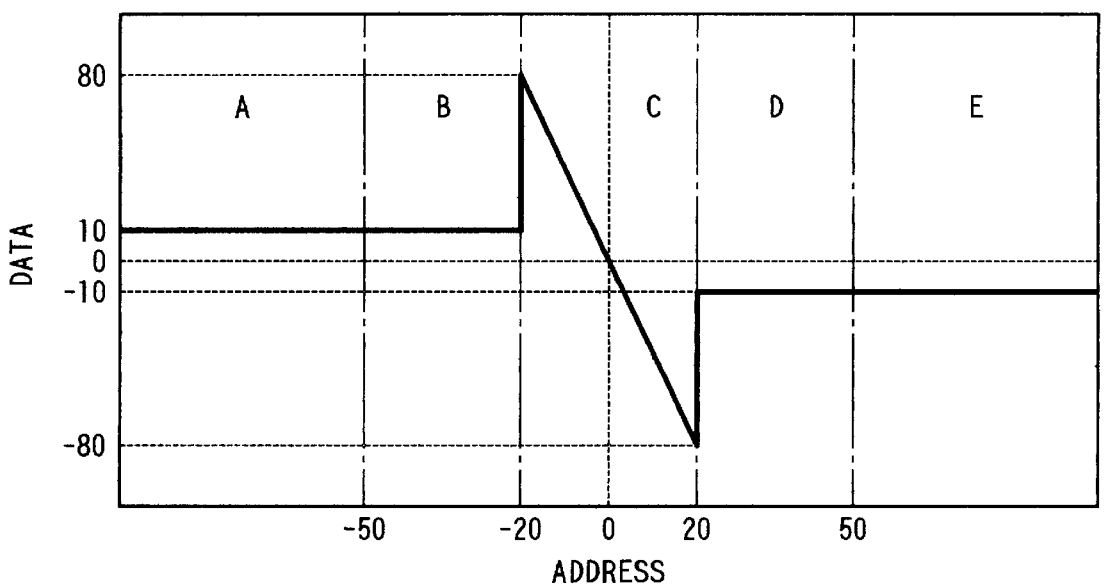
FIG. 6 is a drawing to show information of a pulse width control memory in the first embodiment.

Further, FIG. 6 is a drawing to show plots of the information written in the pulse width control memory 6b. In FIG. 6 the abscissa represents the address (speed information) while the ordinate the data (output) as in FIG. 5. In FIG. 6, areas A to E indicate the same areas as in FIG. 5. In the data configuration as shown in FIG. 6, the pulse width control memory 6b outputs small constant values in the areas of A, B, D, and E where the control of frequency works strong, whereas the pulse width control memory 6b outputs large values depending upon the speed difference in the area of C where the control of frequency does not work so strong. In this example the relation between pulse width and data is determined in such correspondence that the pulse width increases with increasing data.

As described above, in executing the control of vibration motor 3, the weighted speed control for mainly performing the control of frequency is carried out when the drive speed of the vibration motor 3 is far from the target speed, whereby the drive speed quickly approaches the target speed. Once the drive speed of the vibration motor 3 becomes close to the target speed, the weighted speed control for mainly performing the control of pulse width (voltage amplitude) is carried out, whereby the speed can be controlled finely without variations.

Since the frequency control and pulse width control are always carried out simultaneously, the present embodiment can prevent the unstable operation of the motor due to changeover of control as seen in conventional technology.

The present embodiment was described as an example in which the data in areas A and E in FIG. 5 and in the areas A, B, D, E in FIG. 6 was set at a constant value against each address, but the data in these areas may be arranged to vary depending upon the addresses.

(Second Embodiment)

Figure 7:
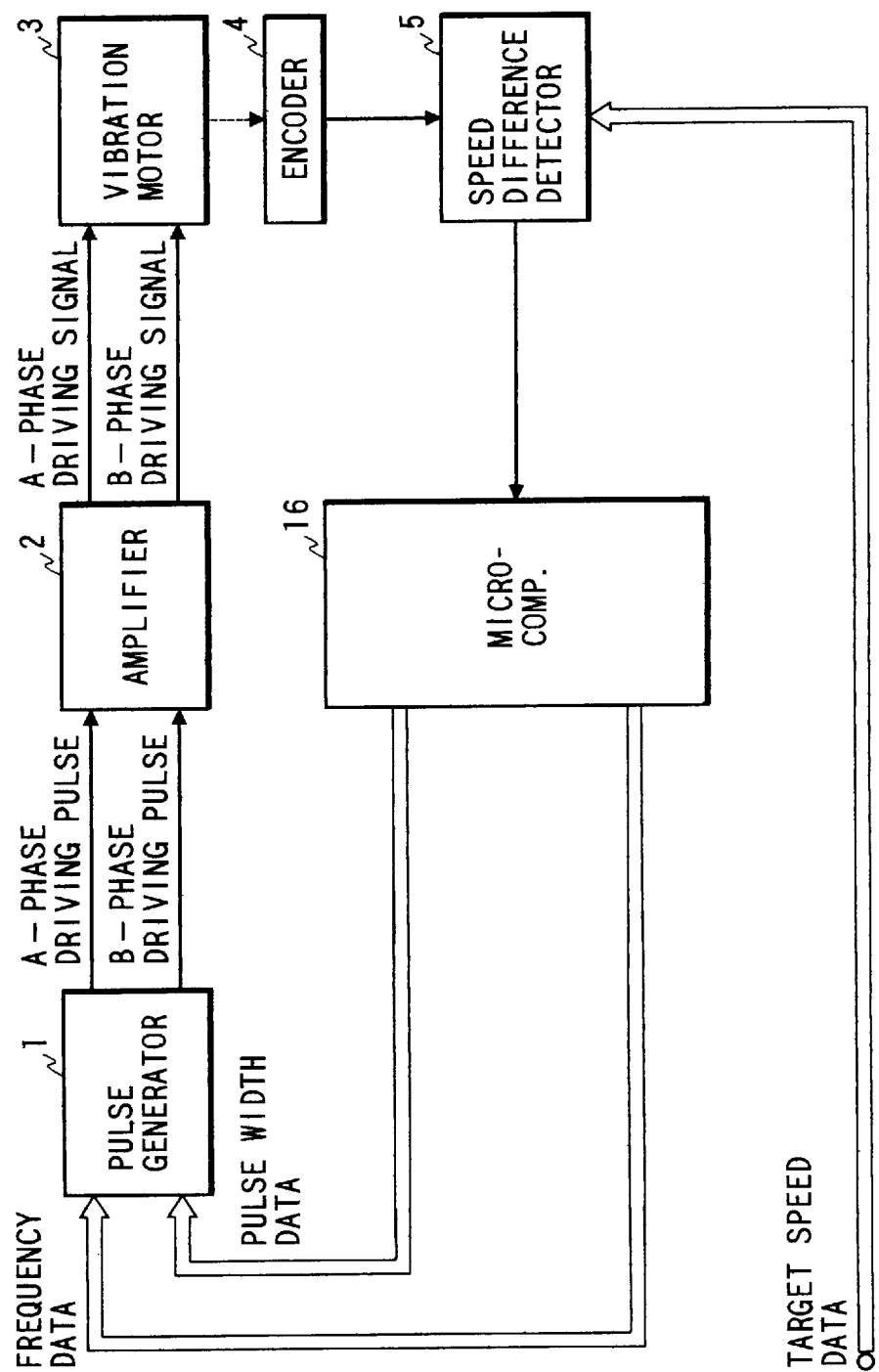
FIG. 7 is a block diagram to show the second embodiment of the present invention.
Figure 8:
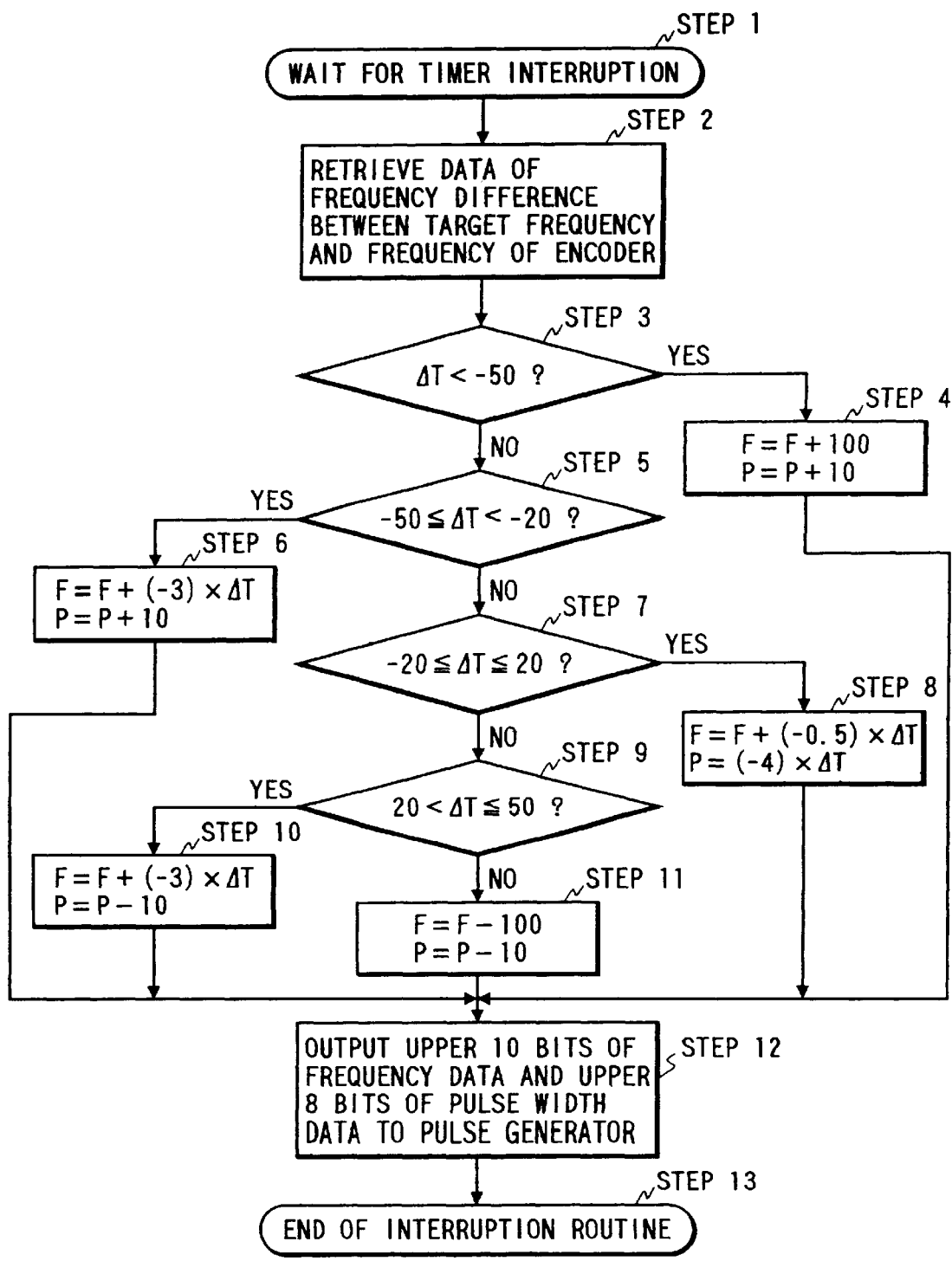
FIG. 8 is a flowchart for control of the second embodiment of the present invention.

FIG. 7 is a block diagram to show the structure of a control apparatus of the vibration motor as the second embodiment of the present invention. FIG. 7 shows the same structure as FIG. 1 except for a microcomputer 16. The present embodiment is arranged so that the microcomputer 16 performs by software the control that was performed by hardware of the memories 6a, 6b and adders 7a, 7b in the first embodiment. FIG. 8 is a flowchart to show the flow of the control executed in the microcomputer 16 of FIG. 7. The constants in the flowchart of FIG. 8 are set so as to effect the same control as in the first embodiment shown in FIG. 5 and FIG. 6. The control will be explained based on the flowchart.

At STEP 1 a timer interruption generated every constant time is waited for. Receiving an interruption, the flow goes to STEP 2.

At STEP 2, retrieved is a value ΔT corresponding to a difference between the period of encoder pulses obtained from the speed difference detector 5 and the target period.

At STEP 3 it is determined whether ΔT retrieved at STEP 2 is smaller than −50. If ΔT<−50 then the flow goes to STEP 4. In this case, ΔT retrieved at STEP 2 is included in area A in FIG. 5 and FIG. 6 of the first embodiment.

At STEP 4, F indicates the frequency data, P the pulse width data, and both of them are 16-bit variables. Since the data is always 100 in the area of A in FIG. 5, 100 is added to the stored frequency data at STEP 4. Since the data is always 10 in the region of A in FIG. 6, 10 is added to the stored pulse width data. When ΔT≦−50 is determined at STEP 3, the flow goes to STEP 5.

At STEP 5 it is determined whether ΔT is between −50 inclusive and −20. If −50≦ΔT<−20 then the flow goes to STEP 6. In this case ΔT retrieved at STEP 2 is included in the area of B in FIG. 5 and FIG. 6. Since in the area of B in FIG. 5 the data is expressed by a straight line with a slope of −3, ΔT×(−3) is added to the stored frequency data at STEP 6. Since in the area of B of FIG. 6 the data is always 10 similarly as in the area of A, 10 is added to the pulse width data. If ΔT≧−20 then the flow goes to STEP 7.

At STEP 7 it is determined whether ΔT is between −20 inclusive and 20 inclusive. If −20≦ΔT≦20 then the flow proceeds to STEP 8. In this case ΔT retrieved at STEP 2 is included in the area of C in FIG. 5 and FIG. 6.

At STEP 8 ΔT×(−0.5) is added to the stored frequency data, because in the area of C in FIG. 5 the data is expressed by a straight line with a slope of −0.5. Since in the area of C of FIG. 6 the data is expressed by a straight line with a slope of −4, ΔT×(−4) is added to the stored pulse width data. When ΔT>20, the flow proceeds to STEP 9.

At STEP 9 it is determined whether ΔT is between 20 and 50 inclusive. If 20<ΔT≦50 then the flow proceeds to STEP 10. In this case ΔT retrieved at STEP 2 is included in area D in FIG. 5 and FIG. 6.

Since in the area of D in FIG. 5 the data is expressed by a straight line with a slope of −3, ΔT×(−3) is added to the stored frequency data at STEP 10. Since the data is always −10 in the area of D in FIG. 6, 10 is subtracted from the stored pulse width data.

When ΔT>50 is determined at STEP 9, the flow goes to STEP 11. In this case, ΔT retrieved at STEP 2 is included in the area of E. Since in the area of E in FIG. 5 the data is always −100, 100 is subtracted from the stored frequency data. Since in the area of E of FIG. 6 the data is always −10 similarly as in the area of D, 10 is subtracted from the stored pulse width data.

The data P of pulse width and the data F of frequency are determined through the steps described above. At STEP 12, similarly as in the adders 7a, 7b of FIG. 1, the upper ten bits out of sixteen bits as to the frequency data and the upper eight bits out of sixteen bits as to the pulse width data are output to the pulse generator 1.

At STEP 13 the interruption is ended and a next timer interruption is waited for.

The above relation between frequency data F and frequency is determined so that the frequency becomes lower with increasing data F, and the data P and pulse width are associated so that the pulse width increases with increasing P.

By performing the control of the vibration motor in the above procedures, the same effects as in the first embodiment of the present invention can also be achieved by software.

(Third Embodiment)

Figure 9:
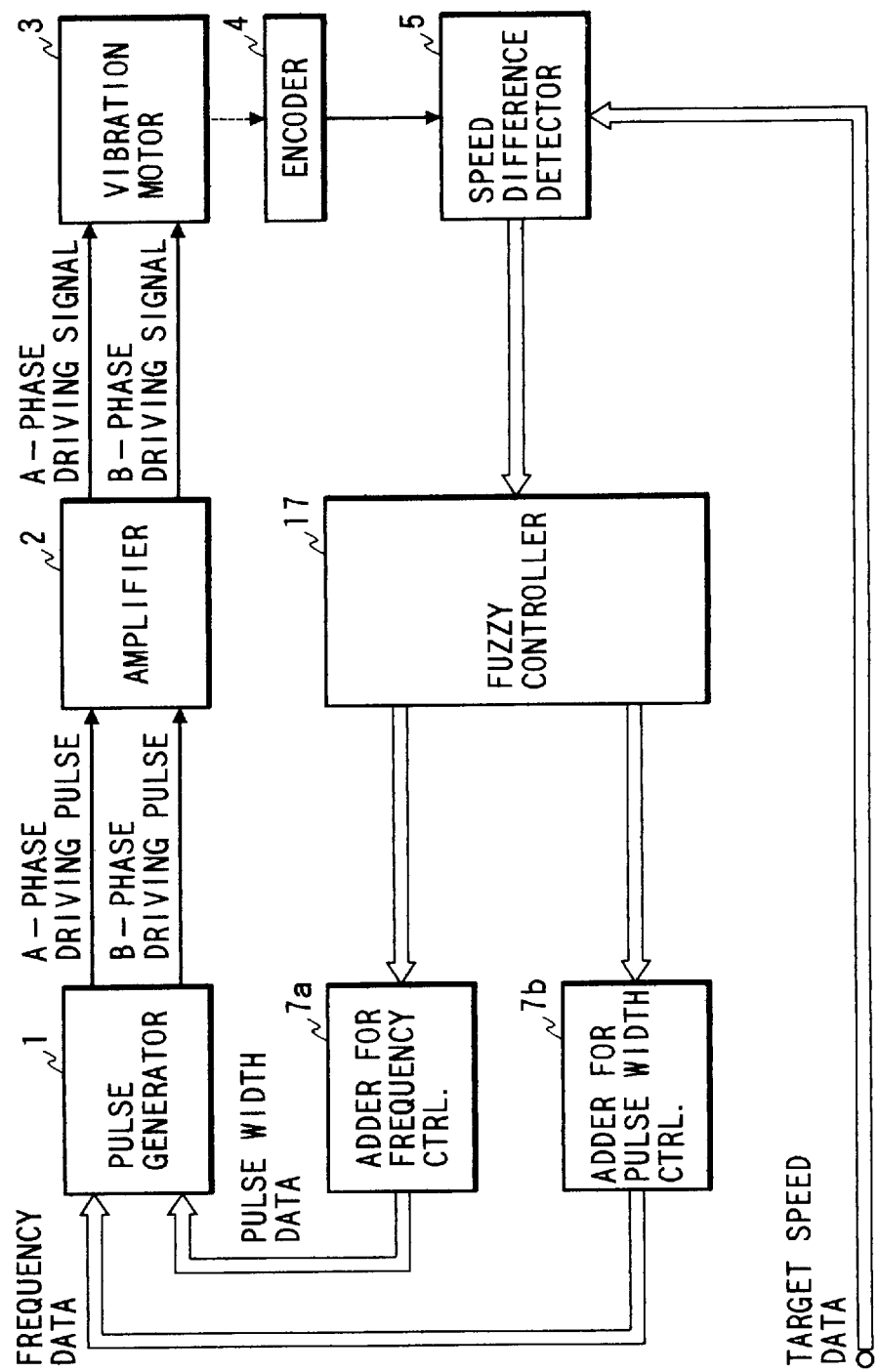
FIG. 9 is a block diagram to show the third embodiment of the present invention.

FIG. 9 is a block diagram to show the structure of a control apparatus of the vibration motor as the third embodiment of the present invention. In FIG. 9, the structure is the same as in FIG. 1 to show the first embodiment of the present invention, except for a fuzzy controller 17. In FIG. 9, the fuzzy controller 17 may be constructed by either software or hardware. The function of the fuzzy controller will be explained below.

The fuzzy controller is, as well known, a controller for analyzing input information with ambiguity like human thinking and outputting values obtained as a result of the analysis. In the present embodiment, input to the fuzzy controller 17 is two inputs of the data obtained from the speed difference detector 5 and the target speed data. Further, the output data is data outputs to the respective adders 7a, 7b for frequency and for pulse width.

Figure 12:
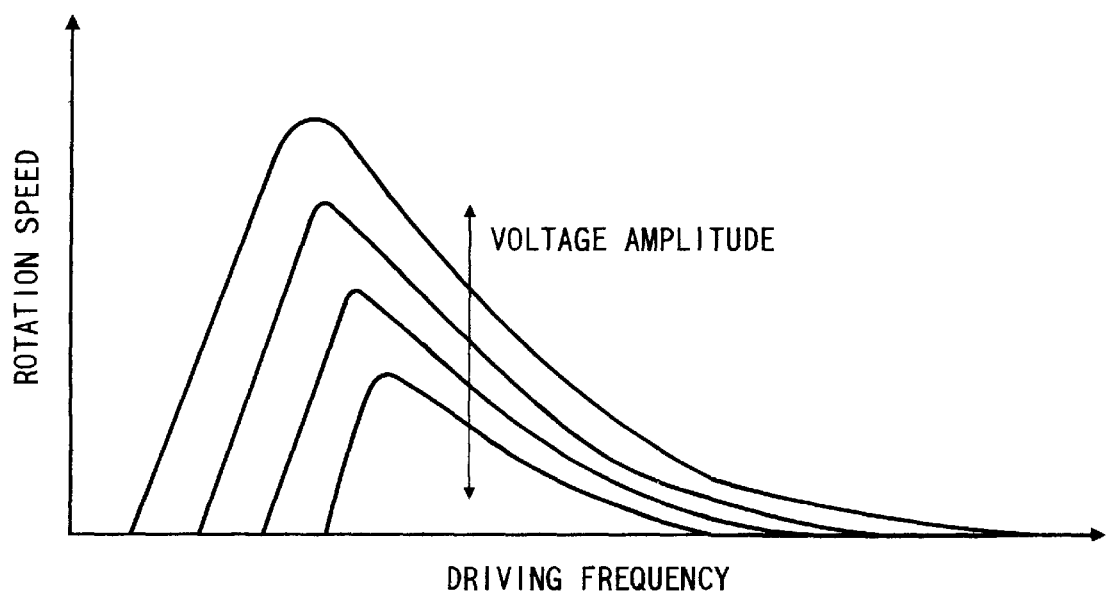
FIG. 12 is a drawing to show frequency vs rotation characteristics of a vibration motor.

For execution of fuzzy control it is necessary to set some if-then rules. The vibration motor 3 has such characteristics that the rotation speed abruptly decreases after the peak of rotation speed as shown in FIG. 12. With a large target speed of the vibration motor 3, a large change of frequency will make the driving state unstable. It is thus necessary to keep the change of frequency not too large for fast target speeds. Since with slow target speeds the slope of speed against frequency becomes gentle, the frequency control can effect smooth speed control to some extent and thus, the pulse width control does not have to function so much.

The first and second embodiments of the present invention as described above are directed to the control to the target speed of $10 \text{ s}^{-1}$. Therefore, for different target speeds, it is necessary to set more suitable feedback gains. The present embodiment is directed to control ready for a wide range of speeds by using the fuzzy controller 17 to set both the rules concerning the first and second embodiments and the rules for the target speeds.

The following rules are set in order to realize the control method in the present invention.

TABLE

| Target speed | Input of speed difference | | | | |
| --- | --- | --- | --- | --- | --- |
| | negatively large | negatively small | nearly 0 | positively small | positively large |
| slow | increase largely | increase | maintain | decrease | decrease largely |
| | increase slightly | increase | maintain | decrease | decrease slightly |
| fast | increase largely | increase slightly | maintn | decrease slightly | decrease largely |
| | increase slightly | increase largely | maintn | decrease largely | decrease slightly |

The above table shows how to change the frequency and pulse width against the target speed and speed difference input. Five states of "negatively large," "negatively small," "nearly 0," "positively small," and "positively large" were set as input states of speed difference. Further, two states of "fast" and "slow" were set for the target speeds. Two rows in each cell of the table indicate outputs, wherein the upper row represents the output to the frequency control adder 7a and the lower row represents the output to the pulse width control adder 7b. Seven states of "decrease largely," "decrease," "decrease slightly," "maintain," "increase slightly," "increase," and "increase largely" were set as states of the outputs. In the above table, for example, at an intersecting portion between "negatively small" of speed difference input and "fast" of target speed, the if-then rule is determined as follows:

"if the speed difference input is negatively small and if the target speed is fast, then increase the frequency data slightly and increase the pulse width data largely."

Here the frequency data is increased. Since the frequency data in the pulse generator 1 is a value corresponding to the period of drive frequency, increase of the frequency data will result in decreasing the frequency, that is, increasing the speed of vibration motor 3. The above table shows the rules for the inputs of all combinations.

Figure 10A:
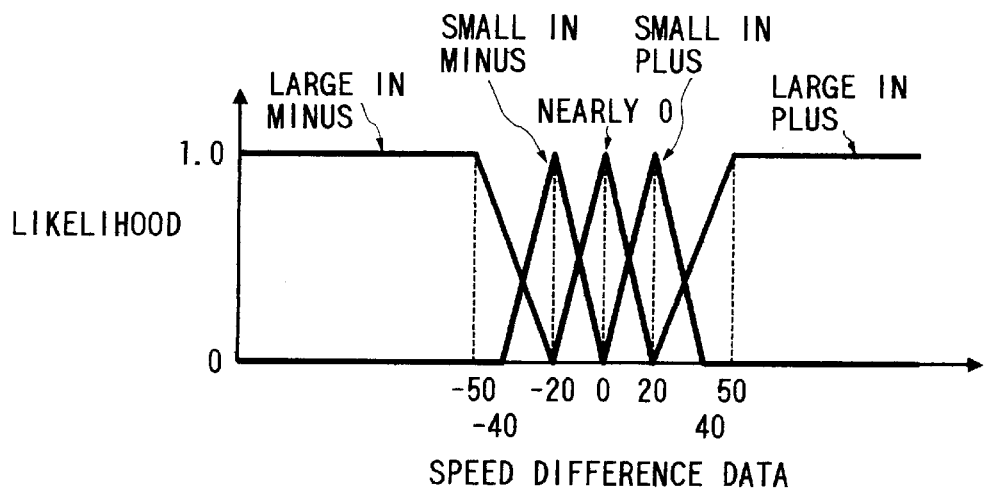
FIGS. 10A, 10B and 10C are drawings to show membership functions in the third embodiment of the present invention.
Figure 10B:
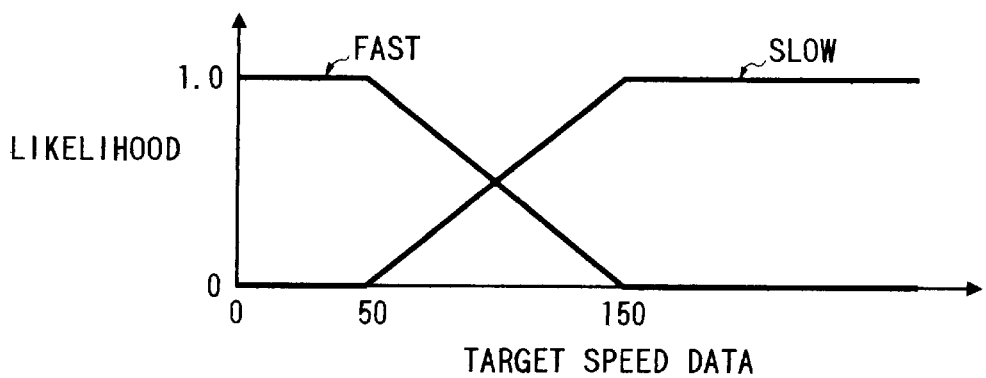
Figure 10C:
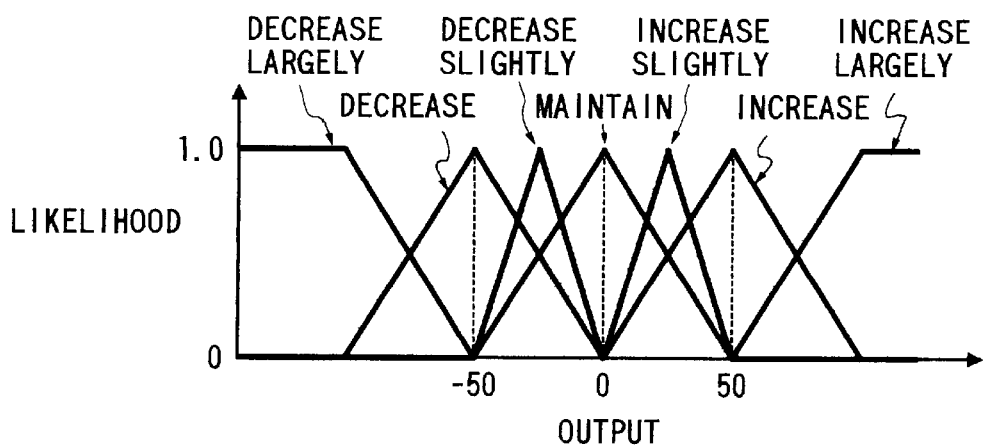

For performing fuzzy control, it is necessary to define membership functions indicating how to handle input data and output data. FIGS. 10A, 10B and 10C show membership functions for speed difference input, target speed, and output, respectively. Since there are the five states set for the speed difference input, the five states are also expressed in the membership functions.

In FIG. 10A, the abscissa represents the input data from the speed difference detector 5 and the ordinate represents likelihood or certainty of each state by numeral between 0 and 1. For example, the state of "positively small" takes the maximum likelihood of 1 at the input data of 20 and decreases on either side of 20. Further, the state of "negatively large" gradually increases its likelihood from the input data −20 to −50 and always takes the maximum likelihood of 1 with input data smaller than −50.

FIG. 10B shows the membership functions for the target speed data, in which the abscissa represents data obtained when the clock of the speed detector counts cycles of pulses from the encoder for a target speed. Therefore, the smaller the value, the faster the target speed.

FIG. 10C shows the membership functions for the output. In this example the frequency control and pulse width control both use these membership functions. However, depending upon the circumstances, the membership functions for the frequency control and for the pulse width control may be set independently. The membership functions set with ambiguity those obtained from experience depending upon the type of motor used, a load on the vibration motor, and so on.

The method of control is next explained. In the fuzzy control, input information is set, it is determined how it is certain against input of the rule, and each output is weighted depending upon a degree of likelihood determined. A determination value of output is obtained by superposition of the weighted outputs. It will be described in detail using an example.

FIG. 11A shows one rule, "if the speed difference input is negatively large and if the target speed is fast then the frequency data is increased largely," among the set rules concerning the frequency control, in which the two left graphs show the membership functions concerning the inputs (the antecedent part) and the right graph is the membership function concerning the output (the consequent part).

First, it is obtained what likelihood the inputs have for the antecedent part. Here, let us suppose that the speed difference data input is −30 and the target speed data is 100. From FIGS. 11A, 11B and 11C at the speed difference input of −30 "negatively large" seems certain in the degree of 0.33 and at the target speed of 100 "fast" seems certain in the degree of 0.5. The smaller of the two degrees obtained is used for weighting of the consequent part. Specifically, a shape obtained by cutting the membership function of the consequent part at 0.33 (the hatched portion of the consequent part) is determined as an inference result of this rule.

FIG. 11B shows another rule, "if the speed difference input is negatively small and if the target speed is slow then the frequency data is increased." In the same way as in FIG. 11A the hatched portion of the consequent part is obtained as an inference result. Based on this technique, inference is made for the all pertinent rules.

FIG. 11C shows superposition of the inference results of the respective rules. A value finally output to the frequency adder 7a is obtained by taking the center of gravity of FIG. 11C. In this example the value of 58 is output.

As for the pulse width control, a value output to the pulse width adder 7b is determined by the same technique. Then weighted control of the speed of vibration motor 3 is carried out according to the determined values output to the frequency adder 7a and to the pulse width adder 7b.

Since it is found that the same effects as in the pulse width control can be achieved by changing a phase difference between two-phase signals applied to the vibration motor, the phase difference control may be employed instead of the pulse width control of the present embodiment. The control data in this case is also set in the same manner as the data of the pulse width control shown in FIG. 6.

The present invention can be applied in combination of the above embodiments and modifications thereof, or technical elements thereof with necessity.

What is claimed is:

1. A vibration type actuator apparatus arranged to apply a cyclic signal to an electro-mechanical energy conversion element to generate vibration in a vibrating member to obtain a driving force, comprising:

a frequency changing circuit that changes the frequency of the cyclic signal in accordance with a control signal, the control signal being information relating to a difference between a target value indicating a target drive state and an actual value indicating an actual drive state of the actuator apparatus;

an amplitude changing circuit that changes the amplitude of the cyclic signal in accordance with the control signal; and an adjusting circuit that adjusts a relation between the amount of change of the frequency by the frequency changing circuit and the amount of change of the amplitude by said amplitude changing circuit in accordance with the control signal, wherein when the control signal indicates that the difference between the target value and the actual value is within a predetermined range, an amount of drive state control by changing the amplitude is made greater than an amount of drive state control by changing the frequency.

2. The apparatus according to claim 1, wherein said adjusting circuit makes the amount of change of the amplitude greater than the amount of change of the frequency when the control signal indicates that the difference between the target value and the actual value is within the predetermined range.

3. The apparatus according to claim 1, wherein when the control signal indicates that the difference between the target value and the actual value is outside the predetermined range, said adjusting circuit makes the amount of change of the drive state control by changing the amplitude smaller than the amount of change of the drive state control by changing the frequency.

4. The apparatus according to claim 1, wherein the target value is a target speed value and the actual value is a present speed value.

5. A vibration type actuator apparatus arranged to apply a cyclic signal to an electro-mechanical energy conversion element to generate vibration in a vibrating member to obtain a driving force, comprising:

a frequency changing circuit that changes the frequency of the cyclic signal in accordance with a control signal, the control signal having a first state and a second state;

an amplitude changing circuit that changes the amplitude of the cyclic signal in accordance with the control signal; and an adjusting circuit that adjusts a contribution rate to a change in the drive state by a change of the frequency and a contribution rate to a change in the drive state by a change of the amplitude in accordance with the state of the control signal, wherein the adjusting circuit makes the contribution rate to the change in the drive state by a change of the amplitude greater than the contribution rate to the change in the drive state by a change of the frequency when the control signal is in the first state, and wherein said adjusting circuit makes the contribution rate to the change in the drive state by change of amplitude smaller than the contribution rate to the change in the drive state by the change of frequency when the control signal is in the second state.

6. The apparatus according to claim 5, wherein said control signal is information relating to a difference between a target value indicating a target drive state and an actual value indicating an actual drive state of the actuator apparatus, and wherein when the control signal indicates that the difference between the target value and the actual value is within a predetermined range, the adjusting circuit makes the contribution rate to the change in the drive state by the change of amplitude greater than the contribution rate to the change in the drive state by the change of frequency.

7. The apparatus according to claim 6, wherein when the control signal indicates that the difference between the target value and the actual value is outside the predetermined range, said adjusting circuit makes the contribution rate to the change in the drive state by the change of amplitude smaller than the contribution rate to the change in the drive state by the change of frequency.

8. A vibration type actuator apparatus arranged to apply cyclic signals with different phases to a first electro-mechanical energy conversion element portion and to a second electro-mechanical energy conversion element portion to generate vibration in a vibrating member to obtain a driving force, comprising:

a frequency changing circuit that changes the frequencies of said cyclic signals in accordance with a control signal, said control signal being information relating to a difference between a target value indicating a target drive state and an actual value indicating an actual drive state of the actuator apparatus;

a phase changing circuit that changes the phases of said cyclic signals in accordance with the control signal; and an adjusting circuit that adjusts a relation between the amount of change of the frequencies by the frequency changing circuit and the amount of change of the phases by said phase changing circuit in accordance with the control signal, wherein when the control signal indicates that the difference between the target value and the actual value is within a predetermined range, an amount of drive state control by changing the phases is made greater than an amount of drive state control by changing the frequencies.

9. The apparatus according to claim 8, wherein when the control signal indicates that the difference between the target value and the actual value is within the predetermined range, said adjusting circuit makes the amount of change of the phases larger and the amount of change of the frequencies smaller.

10. The apparatus according to claim 9, wherein when the control signal indicates that the difference between the target value and the actual value is outside the predetermined range, said adjusting circuit makes the amount of change of the phases smaller and the amount of change of the frequencies larger.

11. The apparatus according to claim 8, wherein the target value is a target speed value and the actual value is a present speed value.

12. A vibration type actuator apparatus arranged to apply cyclic signals with different phases to a first electro-mechanical energy conversion element portion and to a second electro-mechanical energy conversion element portion to generate vibration in a vibrating member to obtain a driving force, comprising:

a frequency changing circuit that changes the frequencies of the cyclic signals in accordance with a control signal, the control signal having a first state and a second state;

a phase changing circuit that changes the phases of the cyclic signals in accordance with the control signal; and an adjusting circuit that adjusts a contribution rate to a change in the drive state by a change of the frequencies and a contribution rate to a change in the drive state by a change of the phases in accordance with a value of the control signal, wherein said adjusting circuit makes the contribution rate to the change in the drive state by a change of the phases greater than the contribution rate to the change in the drive state by a change of the frequencies when the control signal is in the first state, and wherein said adjusting circuit makes the contribution rate to the change in the drive state by the change of the phases smaller than the contribution rate to the change in the drive state by the change of the frequencies when the control signal is in the second state.

13. The apparatus according to claim 12, wherein the control signal is information relating to a difference between a target value indicating a target drive state and an actual value indicating an actual drive state of the actuator apparatus, and wherein when the control signal indicates that the difference between the target value and the actual value is within a predetermined range, said adjusting circuit makes the contribution rate to the change in the drive state by the change of the phases greater than the contribution rate to the change in the drive state by the change of the frequencies.

14. The apparatus according to claim 13, wherein when the control signal indicates that the difference between the target value and the actual value is outside the predetermined range, said adjusting circuit makes the contribution rate to the change in the drive state by the change of the phases smaller than the contribution rate to the change in the drive state by the change of frequencies.

* * * * *

UNITED STATES PATENT AND TRADEMARK OFFICE
CERTIFICATE OF CORRECTION

PATENT NO. : 5,889,350
DATED : March 30, 1999
INVENTOR(S) : SHINJI YAMAMOTO

It is certified that error appears in the above-indentified patent and that said Letters Patent is hereby corrected as shown below:

On the title page, item
[56] References Cited

U.S. PATENT DOCUMENTS

"04140077" should read --4-140077--.

Column 4

Line 17, "the" should be deleted.

Column 7

Line 40, "$20 < \Delta T \geq 50$" should read --$20 < \Delta T \leq 50$--.

Column 12

Line 61, "frequencies." should read --the frequencies.--.

Signed and Sealed this

Twenty-sixth Day of October, 1999

Attest:

Q. TODD DICKINSON

*Attesting Officer*     *Acting Commissioner of Patents and Trademarks*